United States Patent [19]

Yarnell

[11] Patent Number: 4,782,719
[45] Date of Patent: Nov. 8, 1988

[54] SHIFTER HOUSING ASSEMBLY FOR MULTIPLE SPEED POWER TRANSMISSION

[75] Inventor: James A. Yarnell, Temperance, Mich.

[73] Assignee: Dana Corporation, Toledo, Ohio

[21] Appl. No.: 48,150

[22] Filed: May 11, 1987

[51] Int. Cl.$^4$ .............. F16H 57/02; G05G 5/10; G05G 3/00; G05G 13/00
[52] U.S. Cl. ........................... 74/606 R; 74/477
[58] Field of Search ............. 74/606 R, 477, 473 R, 74/475

[56] References Cited

U.S. PATENT DOCUMENTS

| | | | |
|---|---|---|---|
| 1,011,788 | 12/1911 | Hodgkinson | 74/606 |
| 1,258,447 | 3/1918 | Pedelty | 74/606 |
| 1,811,932 | 6/1931 | Hodgkins . | |
| 2,018,706 | 10/1935 | Crawford et al. . | |
| 2,107,463 | 2/1938 | Woltersdorf . | |
| 2,637,221 | 5/1953 | Backus et al. | 74/477 |
| 2,661,630 | 12/1953 | Thompson | 74/477 |
| 3,006,212 | 10/1961 | Galonska | 74/606 |
| 4,022,083 | 5/1977 | Pollak Banda et al. | 74/606 R |
| 4,335,623 | 6/1982 | Kronstadt | 74/477 |
| 4,513,599 | 4/1985 | Harris | 74/606 R |
| 4,550,628 | 11/1985 | Yarnell | 74/477 |

FOREIGN PATENT DOCUMENTS

| | | | |
|---|---|---|---|
| 1249710 | 9/1967 | Fed. Rep. of Germany | 74/477 |
| 326945 | 3/1930 | United Kingdom | 74/477 |

OTHER PUBLICATIONS

Pp. 205 and 206 of Technical Drawing (Seventh Edition) published by Macmillan Publishing Co., Inc.

Primary Examiner—Richard E. Moore
Assistant Examiner—Vinh Luong
Attorney, Agent, or Firm—Willian Brinks Olds Hofer Gilson & Lione

[57] ABSTRACT

A shifter housing assembly for a multiple speed power transmission which includes a die cast shifter housing, a plurality of axially shiftable cylindrical shifter rods slidably contained in circumferentially open, part-cylindrical notches in the housing, a poppet type interlock mechanism that is contained in a circumferentially open, interrupted notch which extends through the circumferentially open notches to engage the shifter rods and limit the axial shifting of the shifter rods, and a stamped steel retainer plate which is removably attached to the housing to retain the shifter rods in the part-cylindrical notches and the interlock mechanism in the interrupted notch. The retainer plate has a plurality of part-cylindrical notch portions which are aligned with the part-cylindrical notches in the housing to form generally cylindrical passages for the shifter rods.

19 Claims, 2 Drawing Sheets

SHIFTER HOUSING ASSEMBLY FOR MULTIPLE SPEED POWER TRANSMISSION

BACKGROUND OF THE INVENTION

This invention generally relates to a shifter housing assembly for a multiple speed power transmission. More particularly, this invention relates to an assembly of the foregoing character which includes two or more shifter rods that extend parallel to one another, a system of poppet interlocks that serves to maintain the shifter rods in their desired positions, a housing with suitable passages therein for the shifter rods and for the elements of the system of poppet interlocks, and retainers for retaining the shifter rods and the elements of the system of poppet interlocks in the appropriate passages of the housing.

The shifter housing of a multiple speed power transmission, for example, a manual shift transmission for a truck engine, is, typically, a complex part which is produced from aluminum or a ferrous metal by a casting process such as a die casting process. Heretofore, housings of this type required extensive machining to provide suitable passages to accommodate the shifter rods that are carried thereby and the reciprocating movement required of each of such shifter rods to achieve the changes in gear ratios that are required of the associated transmission. The extensive amount of machining required to provide suitable passages in a shifter housing for all of the shifter rods to be carried thereby, especially in a truck transmission having a relatively large number of forward speeds, for example, seven (7) forward speeds in addition to the customary reverse speed, plus all of the machining required to provide suitable passages in the shifter housing for all of the elements of the system of poppet interlocks for maintaining the shifter rods in their desired positions, added greatly to the cost of manufacture of the shifter housing itself and, thus, to the cost of manufacture of the assembly that included such shifter housing. Further, the use of such machined passages, which were circumferentially closed, added greatly to the cost of assembling the shifter rods, the elements of the system of interlocks and the shifter housing itself into an assembly of such components, due to the need to "thread" the shifter rods and the elements of the system of interlocks into their respective passages, that is, by moving such rods and such elements along their longitudinal axes into such passages.

SUMMARY OF THE INVENTION

The shifter housing assembly of the present invention includes a metallic shifter housing which is formed by casting, for example, by die casting, and which is formed with circumferentially open passages for receiving the shifter rods and the elements of a system of poppet interlocks that are conventionally components of such a shifter housing assembly, and without the need for threading such shifter rods or such elements into their respective passages. The circumferentially open passages of the shifter housing can be formed with surfaces whose dimensions and textures are sufficiently precise to be suitable for use in the "as formed" condition, thus permitting the elimination of much expensive machining in relationship to prior art shifter housings. Further, because of the openness of the passages for the shifter rods and the elements of the system of poppet interlocks, the assembly of the shifter rods and the elements of the system of poppet interlocks into the passages of the shifter housing can proceed much more quickly and, thus, at a considerable reduction in assembly cost, relative to prior art shifter housing assemblies.

DETAILED DESCRIPTION OF THE PREFERRED EMBODIMENT

Figure 1:
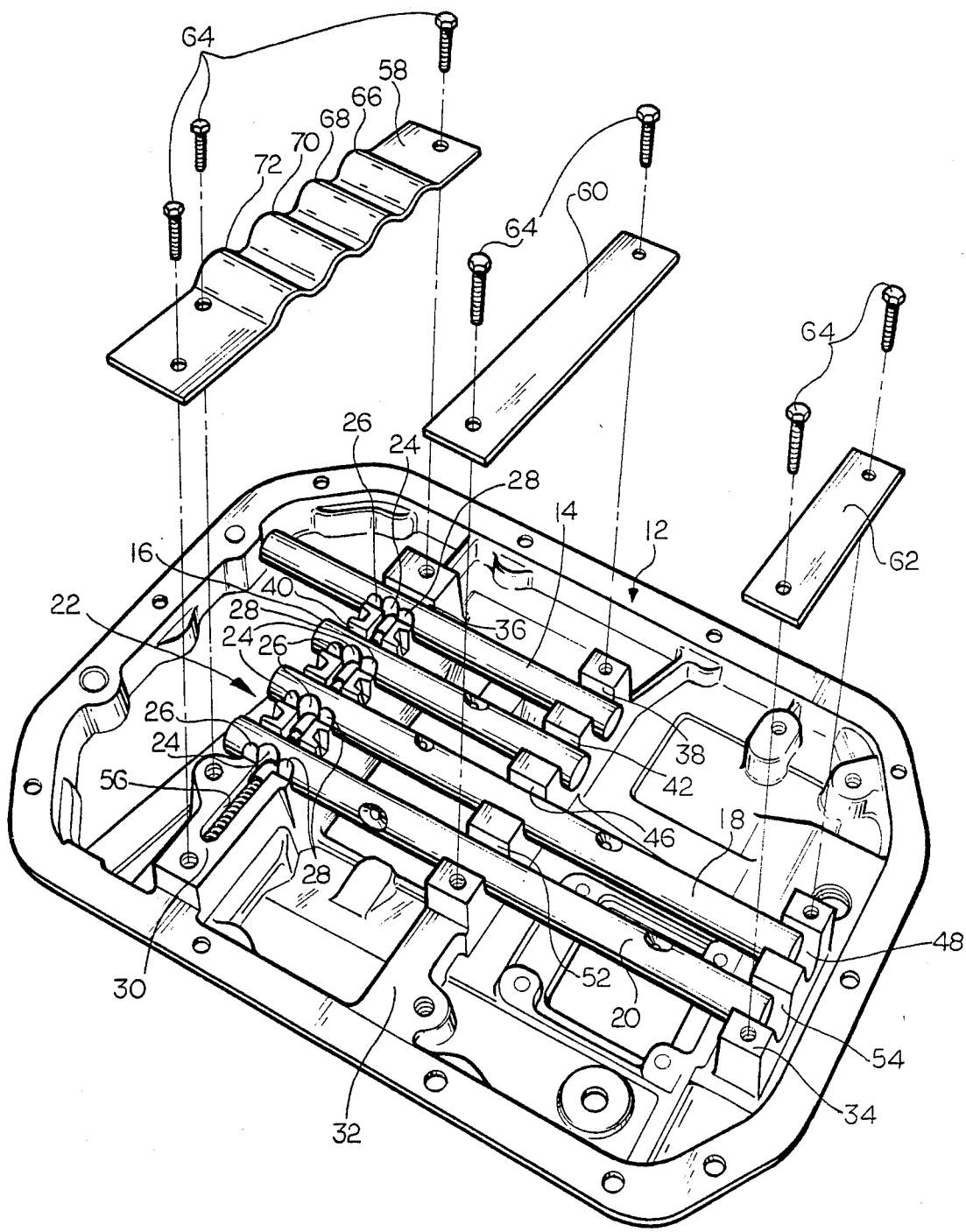
FIG. 1 is an exploded view, in perspective, of a preferred embodiment of a shifter housing assembly according to the present invention.
Figure 3:
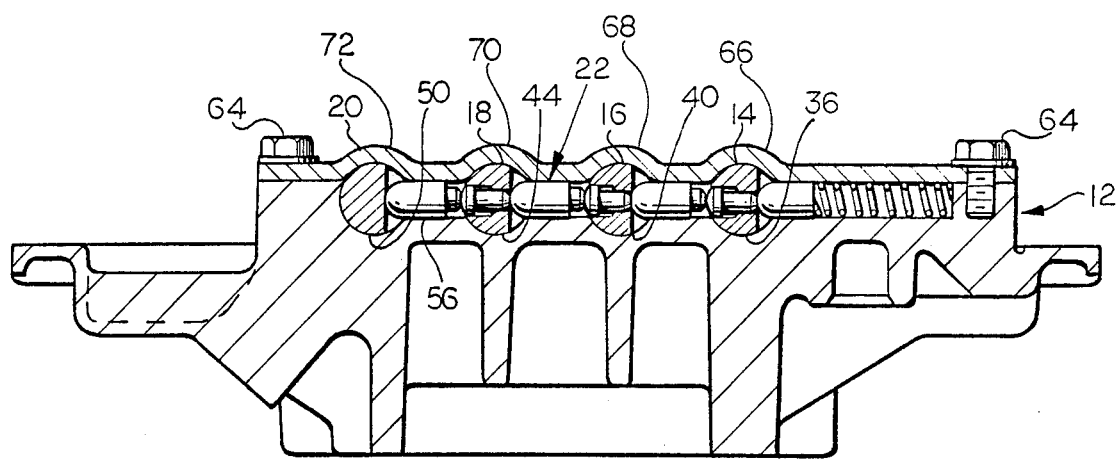
FIG. 3 is a sectional view taken on line 3—3 of FIG. 2.
Figure 2:
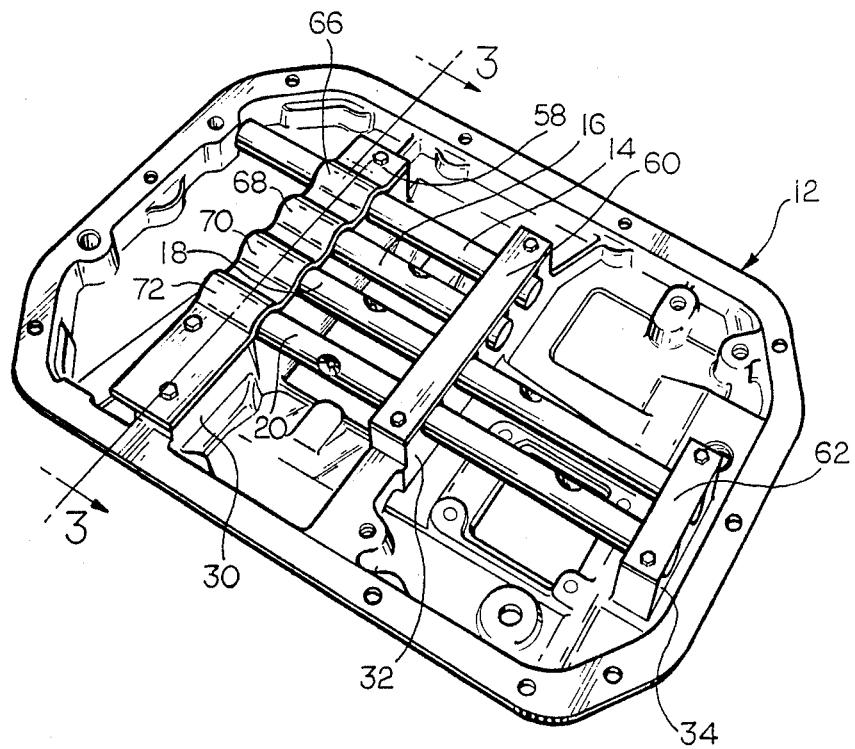
FIG. 2 is a perspective view, at a somewhat reduced scale in comparison to FIG. 1, of the shifter housing assembly of FIG. 1 with all of the components thereof in assembled relationship.

As is shown in FIG. 1, the preferred embodiment of the shifter housing assembly of the present invention includes a generally concave shifter housing 12 which contains a cavity and which is designed to be secured to a multiple speed power transmission, not shown, for example, to a transmission for an over the road truck. The shifter housing 12 has an irregular configuration and, typically, is integrally formed in such irregular configuration in one piece from molten aluminum or from a molten ferrous metal by a casting operation, such as die casting.

The shifter housing assembly further includes transmission shifter rods 14, 16, 18, and 20 which are positioned in spaced apart, parallel relationship to one another within the cavity of the shifter housing 12 and which are reciprocally slidable with respect to the shifter housing 12 and with respect to each other. Preferably, as shown, each of the shifter rods 14, 16, 18 and 20 is generally cylindrical in configuration. Further, the shifter housing assembly also includes a transmission shift interlock mechanism of the poppet type. The shift interlock mechanism is generally identified by reference numeral 22, and corresponds to the mechanism that is described in my prior U.S. Pat. No. 4,550,628, which is assigned to the assignee of this application and which is hereby incorporated in this specification by reference. For present purposes, it is noted that the shift interlock mechanism 22 extends generally transversely of the shifter rods 14, 16, 18, and 20 and cooperates with an axial series of notches 24, 26 and 28 in each of the shifter rods 14, 16, 18, and 20 to limit the axial movement of each of the shifter rods 14, 16, 18 and 20 and to prevent any of the shifter rods 14, 16, 18, and 20 from being moved out of its neutral position, that is, the position where its center or neutral notch 24 is aligned with the shift interlock mechanism 22, when any of the other of the shifter rods 14, 16, 18 and 20 is out of its neutral position.

The shifter housing 12 has spaced apart, parallel bridges 30, 32 and 34 positioned within the cavity thereof and extending transversely of the shifter rods 14, 16, 18 and 20. Bridges 30 and 32, respectively, have aligned notches 36 and 38 which slidably receive the shifter rod 14, and aligned notches 40 and 42, respectively, which slidably receive the shifter rod 16; bridges 30, 32 and 34, respectively, have aligned notches 44, 46 and 48 which slidably receive the shifter rod 18; and bridges 30, 32 and 34, respectively, have aligned notches 50, 52 and 54 which slidably receive the shifter rod 20. Each of the notches 36, 38, 40, 42, 44, 46, 48, 50, 52 and 54 is circumferentially open to permit the shifter rods 14, 16, 18 and 20 to be directly inserted in the shifter housing 12 without requiring careful threading of shifter rods into circumferentially closed passages, as was characteristic of many prior art shifter housing designs. Preferably, each of the notches 36, 38, 40, 42, 44, 46, 48, 50, 52 and 54 conforms in shape to the shape of the shifter rod that is received therein to provide surface to surface contact between such notch and shifter rod, that is, when any such shifter rod is cylindrical in configuration, the notches which receive such shifter rod are part-cylindrical in configuration and have an equal or slightly greater radius of curvature to that of such shifter rod. Further, it has been found that each of such notches can be used in an as formed condition, at least when the shifter housing 12 is produced by a die casting operation, without requiring a surface machining operation on the shifter rod engaging surface thereof, thereby eliminating the need for extensive machining operations that was characteristic of many prior art shifter housing designs.

The advantages which result from the positioning of shifter rods 14, 16, 18 and 20 in open notches in the bridges 30, 32 and 34 of the shifter housing 12, as described above, can also be realized in the assembly of the various elements of the interlock mechanism 22 to the shifter housing 12 by providing the bridge 30 with an interrupted notch 56 extending longitudinally thereof, that is, extending transversely of the shifter rods 14, 16, 18 and 20 through the notches 36, 40, 44 and 50. The interrupted notch 56 may also be used in an as formed condition, and it permits the elements of the interlock mechanism 22 to be directly inserted therein, without requiring careful threading of such elements into a circumferentially closed passage, as was characteristic of many prior art shifter housing designs.

After the shifter rods 14, 16, 18 and 20 and the interlock mechanism 22 have been assembled to the shifter housing 12, as heretofore described, they may be retained in place by means of retainer plates 58, 60 and 62 which are secured to bridges 30, 32 and 34, respectively, by threaded fasteners 64 each of which, preferably, is a self tapping screw for rapid assembly. The retainer plates 60 and 62, as shown, preferably, are flat plates which are formed from rolled steel, and the notches which are covered thereby, namely the notches 38, 42, 46 and 52 in the bridge 32 which are covered by the retainer plate 60 and the notches 48 and 54 in the bridge 34 which are covered by the retainer plate 62, are each as deep as the shifter rod which is inserted therein to permit the use of flat plates as the retainer plates 60 and 62 without permitting excess clearance for the shifter rods after the attachment of the retainer plates 60 and 62 to the bridges 32 and 34, respectively.

To provide a suitable wear surface for the reciprocation of the shifter rods 14, 16, 18 and 20, the notches 36, 40, 44 and 50 in the bridge 30 are each shallower than the depth of the respective one of the shifter rods 14, 16, 18 and 20 that is received therein, and the retainer plate 58 which is to be attached to the bridge 30 is provided with spaced apart part-cylindrical notch portions 66, 68, 70 and 72. The part-cylindrical notch portions 66, 68, 70 and 72 are aligned with the notches 36, 40, 44 and 50, respectively, to form generally cylindrical passages for the shifter rods 14, 16, 18 and 20. Preferably, the retainer plate 58 is a formed, stamped plate which is formed from rolled steel, and because of the work hardening thereof which results from the forming of the part-cylindrical notches 66, 68, 70 and 72 therein, for example, in a stamping operation, good wear characteristics are provided on a surface to surface basis between the shifter rods 14, 16, 18 and 20 and the retainer plate 58. The interrupted notch 56 in the bridge 30 for the interlock mechanism 22 is slightly greater as the maximum diameter of the elements of the interlock mechanism 22 to provide sufficient clearance for the movement of the elements of the interlock mechanism 22 in the interrupted notch 56. Thus, these elements may be retained in place in a satisfactory manner by the portions of the retainer plate 58 which are not occupied by the part-cylindrical notch portions 66, 68, 70 and 72, which non-part-cylindrical portions are flat and coplanar.

Although one preferred embodiment of this invention has been described and illustrated herein, the following claims are intended to cover various other embodiments which fall within the spirit and scope thereof.

What is claimed is:

1. A shifter housing assembly for a multiple speed power transmission comprising: a housing, said housing being formed integrally in one piece from a first metallic material and having a plurality of circumferentially open notches formed therein, each of said notches having a longitudinal axis, the longitudinal axes of said notches being spaced apart and being disposed parallel to one another; a plurality of shifter rods, one of said plurality of shifter rods being mounted for shifting movement in each of said plurality of notches along said longitudinal axis of said each of said plurality of notches and engaging an as formed surface of said each of said plurality of notches; a circumferentially open interrupted notch extending transversely through said plurality of notches; interlock mechanism means slidably positioned in said interrupted notch and engaging each of said plurality of shifter rods; and a retainer formed from a second metallic material removably attached to said housing and retaining said plurality of shifter rods in said plurality of notches and said interlock mechanism means in said interrupted notch, said second metallic material being different than said first metallic material.

2. A shifter housing assembly according to claim 1 wherein said housing has a generally concave shape and defines a cavity, wherein said housing further comprises a bridge disposed within said cavity, and wherein each of said plurality of notches and said interrupted notch is formed in said bridge.

3. A shifter housing assembly according to claim 2 herein said housing is formed by die casting.

4. A shifter housing assembly according to claim 3 wherein each of said plurality of shifter rods has a generally cylindrical configuration and wherein said each of said plurality of notches in which said each of said plurality of shifter rods is mounted has a part-cylindrical surface.

5. A shifter housing assembly according to claim 3 wherein said retainer is a stamped steel plate and further comprising a plurality of threaded fasteners removably attaching said retainer to said housing.

6. A shifter housing assembly according to claim 5 wherein each of said plurality of threaded fasteners is a self tapping screw.

7. A shifter housing assembly for a multiple speed power transmission comprising: a housing, said housing being formed integrally in one piece from a first metallic material and having a plurality of circumferentially open, part-cylindrical notches formed therein, each of said part-cylindrical notches having a diameter, a depth which is less than said diameter, and a longitudinal axis, the longitudinal axes of said notches being spaced apart and being disposed parallel to one another; a plurality of generally cylindrical shifter rods, one of said plurality of generally cylindrical shifter rods being mounted for surface to surface sliding movement in each of said part-cylindrical notches along said longitudinal axis of said each of said plurality of part-cylindrical notches and engaging an as formed surface of said each of said plurality of notches; a circumferentially open interrupted notch extending transversely through said plurality of part-cylindrical notches, said interrupted notch having a depth; interlock mechanism means slidably positioned in said interrupted notch and engaging each of said plurality of shifter rods, said interlock mechanism means having a depth which is not greater than said depth of said interrupted notch; and a retainer formed from a second metallic material removably attached to said housing and retaining said plurality of shifter rods in said plurality of part-cylindrical notches, said retainer having a plurality of spaced apart, part-cylindrical notch portions, each of said plurality of part-cylindrical notch portions of said retainer being aligned with one of said plurality of part-cylindrical notches of said housing and defining a generally cylindrical passage therewith, said each of said plurality of part-cylindrical notch portions of said retaine engaging said one of said plurality of generally cylindrical shifter rods in surface to surface sliding engagement, said retainer further having spaced apart, flat, coplanar portions retaining said interlock mechanism in said interrupted notch, said second metallic material being different than said first metallic material.

8. A shifter housing assembly according to claim 7 wherein said housing has a generally concave shape and defines a cavity, wherein said housing further comprises a bridge disposed within said cavity, and wherein each of said plurality of part-cylindrical notches and said interrupted notch is formed in said bridge.

9. A shifter housing assembly according to claim 8 wherein said housing is formed by die casting.

10. A shifter housing assembly according to claim, 9 wherein said retainer is a stamped steel plate and further comprising a plurality of threaded fasteners removably attaching said retainer to such housing.

11. A shifter housing assembly according to claim 10 wherein each of said plurality of threaded fasteners is a self tapping screw.

12. A shifter housing assembly for a multiple speed power transmission comprising: a housing, said housing a first plurality of circumferentially open, part-cylindrical notches formed therein, each of said part-cylindrical notches in said first plurality having a diameter, a depth which is less than said diameter, and a longitudinal axis, the longitudinal axes of said part-cylindrical notches in said first plurality being spaced apart and being disposed parallel to one another; a second plurality of circumferentially open, part-cylindrical notches, each of said part-cylindrical notches in said second plurality having a diameter, a depth which is at least as great as said second diameter, and a longitudinal axis, the longitudinal axes of said part-cylindrical notches in said second plurality being spaced apart and being disposed parallel to one another, the longitudinal axis of each of said part-cylindrical notches in said second plurality being axially aligned with the longitudinal axis of one of said part-cylindrical notches in said first plurality; a plurality of generally cylindrical shifter rods, one of said plurality of generally cylindrical shifter rods being mounted in surface to surface sliding movement in each of said part-cylindrical notches in said first plurality along said longitudinal axis of said each of said part-cylindrical notches in said first plurality and in each of said part-cylindrical notches in said second plurality along said longitudinal axis of said each of said part-cylindrical notches in second plurality; a circumferentially open interrupted notch extending transversely through said first plurality of part-cylindrical notches, said interrupted notch having a depth; interlock mechanism means slidably positioned in said interrupted notch and engaging each of said plurality of shifter rods, said interlock mechanism means having a depth which is not greater than said depth of said interrupted notch; a first retainer removably attached to said housing and retaining said plurality of shifter rods in said first plurality of part-cylindrical notches, said first retainer having a plurality of spaced apart, part-cylindrical notch portions, each of said plurality of part-cylindrical notch portions of said first retainer being aligned with one of said first plurality of part-cylindrical notches of said housing and defining a generally cylindrical passage therewith, said each of said plurality of part-cylindrical notch portions of said first retainer engaging said one of said plurality of generally cylindrical shifter rods in surface to surface sliding engagement, said first retainer further having spaced apart, flat, coplanar portions retaining said interlock mechanism in said interrupted notch; and a second retainer removably attached to said housing and retaining said plurality of shifter rods in said second plurality of part-cylindrical notches.

13. A shifter housing assembly according to claim 12 wherein said housing has a generally concave shape and defines a cavity, wherein said housing further comprises spaced apart first and second bridges disposed within said cavity, wherein each of said first plurality of part-cylindrical notches and said interrupted notch is formed in one of said first and second bridges, and wherein each of said second plurality of part-cylindrical notches is formed in the other of said first and second bridges.

14. A shifter housing assembly according to claim 13 wherein said first and second bridges extend generally parallel to one another.

15. A shifter housing assembly according to claim 14 wherein said housing is formed integrally in one piece from a metallic material.

16. A shifter housing assembly according to claim 15 wherein said housing is formed by die casting.

17. A shifter housing assembly according to claim 16 wherein one of said plurality of shifter rods slidably engages an as formed surface of each of said first plurality of part-cylindrical notches in surface to surface contact and an as formed surface of each of said second plurality of part-cylindrical notches in surface to surface contact.

18. A shifter housing assembly according to claim 17 wherein said first retainer is a stamped steel plate and wherein said second retainer is a flat, rolled steel plate, and further comprising a first plurality of threaded fasteners removably attaching said first retainer to said housing and a second plurality of threaded fasteners removably attaching said second retainer to said housing.

19. A shifter housing assembly according to claim 19 wherein each of said first plurality of threaded fasteners and each of said second plurality of threaded fasteners is a self tapping screw.

* * * * *

UNITED STATES PATENT AND TRADEMARK OFFICE
CERTIFICATE OF CORRECTION

PATENT NO. : 4,782,719

DATED : November 8, 1988

INVENTOR(S) : James A. Yarnell

It is certified that error appears in the above-identified patent and that said Letters Patent are hereby corrected as shown below:

Column 4, line 52, change "herein" to -- wherein --.

Column 5, line 53, after "housing" insert -- having --.

Column 6, line 64, change "19" (second occurrence) and insert -- 18 --.

Signed and Sealed this

Seventh Day of March, 1989

Attest:

DONALD J. QUIGG

*Attesting Officer*   *Commissioner of Patents and Trademarks*